United States Patent
Abe et al.

(10) Patent No.: US 8,275,721 B2
(45) Date of Patent: Sep. 25, 2012

(54) METHODS AND SYSTEMS FOR COST-SENSITIVE BOOSTING

(75) Inventors: Naoki Abe, Rye, NY (US); Aurelie C. Lozano, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 12/190,325

(22) Filed: Aug. 12, 2008

(65) Prior Publication Data
US 2010/0042561 A1    Feb. 18, 2010

(51) Int. Cl.
*G06F 15/18* (2006.01)
(52) U.S. Cl. .............................. 706/12; 706/14
(58) Field of Classification Search .................. None
See application file for complete search history.

(56) References Cited

U.S. PATENT DOCUMENTS

2005/0289089 A1* 12/2005 Abe et al. ................. 706/12

OTHER PUBLICATIONS

Servedio, R., (2002). Pac Analogues of Perceptron and Winnow Via Boosting the Margin. Machine Learning, 47, 133-151.*
Zadrozny, B. et al., Learning and Making Decisions When Costs and Probabilities are Both Unknown, Proceedings of the 7th International Conference on Knowledge Discovery and Data Mining, ACM Press, 2001, pp. 204-213.
Chan, P. et al., Toward Scalable Learning with Non-uniform Class and Cost Distributions: A Case Study in Credit Card Fraud Detection, Proceedings of the 4th International Conference on Knowledge Discovery and Data Mining, 1998, pp. 164-168.
Zadrozny, B. et al., Cost-Sensitive Learning by Cost-Proportionate Example Weighting, Proceedings of the 3rd IEEE International Conference on Data Mining, 2003, pp. 435-442.
Fan, W. et al., AdaCost: Misclassification Cost-sensitive Boosting, Proceedings of the 16th International Conference on Machine Learning, 1999, pp. 97-105.
Ting, K. M., A Comparative Study of Cost-Sensitive Boosting Algorithms, Proceedings of the 17th International Conference on Machine Learning, 2000, pp. 983-990.
Mason, L. et al., Boosting Algorithms as Gradient Descent, In Advances in Neural Information Processing Systems, 2000, pp. 512-558, vol. 12.
Abe, A. et al, An Iterative Method for Multi-class Cost-sensitive Learning, KDD '04: Proceeding of the 10th ACM SIGKDD International Conference on Knowledge Discovery and Data Mining, 2004, pp. 3-11, NY, New York.

(Continued)

*Primary Examiner* — Omar Fernandez Rivas
*Assistant Examiner* — Daniel Pellett
(74) *Attorney, Agent, or Firm* — Scully, Scott, Murphy & Presser, P.C.; Daniel P. Morris, Esq.

(57) ABSTRACT

Multi-class cost-sensitive boosting based on gradient boosting with "p-norm" cost functionals" uses iterative example weighting schemes derived with respect to cost functionals, and a binary classification algorithm. Weighted sampling is iteratively applied from an expanded data set obtained by enhancing each example in the original data set with as many data points as there are possible labels for any single instance, and where each non-optimally labeled example is given the weight equaling a half times the original misclassification cost for the labeled example times the p−1 norm of the average prediction of the current hypotheses. Each optimally labeled example is given the weight equaling the sum of the weights for all the non-optimally labeled examples for the same instance. Component classification algorithm is executed on a modified binary classification problem. A classifier hypothesis is output, which is the average of all the hypotheses output in the respective iterations.

15 Claims, 8 Drawing Sheets

OTHER PUBLICATIONS

Freund, Y. et al., A Decision-Theoretic Generalization of On-Line Learning and an Application to Boosting, Journal of Computer and System Sciences, 1997, pp. 119-139, vol. 55, No. 1.

The "UCI KDD Archive", Information and Computer Science, University of California, Irvine, 1999, http://kdd.ics.uci.edu/.

Blake, C. L. et al., UCI Repository of Machine Learning Databases, Department of Information and Computer Sciences, 1998, University of California, Irvine, California, http://archive.ics.uci.edu/ml/.

Schapire, R. E. et al., Improved Boosting Using Confidence-Rated Predictions, Machine Learning, 1999, pp. 297-336, vol. 37, No. 3.

Domingos, P., MetaCost: A General Method for Making Classifiers Cost Sensitive, Proceedings of the 5th International Conference on Knowledge Discover and Data Mining, ACM Press, 1999, pp. 155-164.

Elkan, C., Magical Thinking in Data Mining: Lessons from Coil Challenge 2000, Proceedings of the 7th International Conference on Knowledge and Data Mining, ACM Press, 1999, pp. 426-431.

Witten, I. H., Data Mining: Practical Machine Learning Tools with Java Implementations, Morgan Kaufmann, 2000.

Quinlan, C4.5:Programs for Machine Learning, Morgan Kaufmann, 1993.

\* cited by examiner

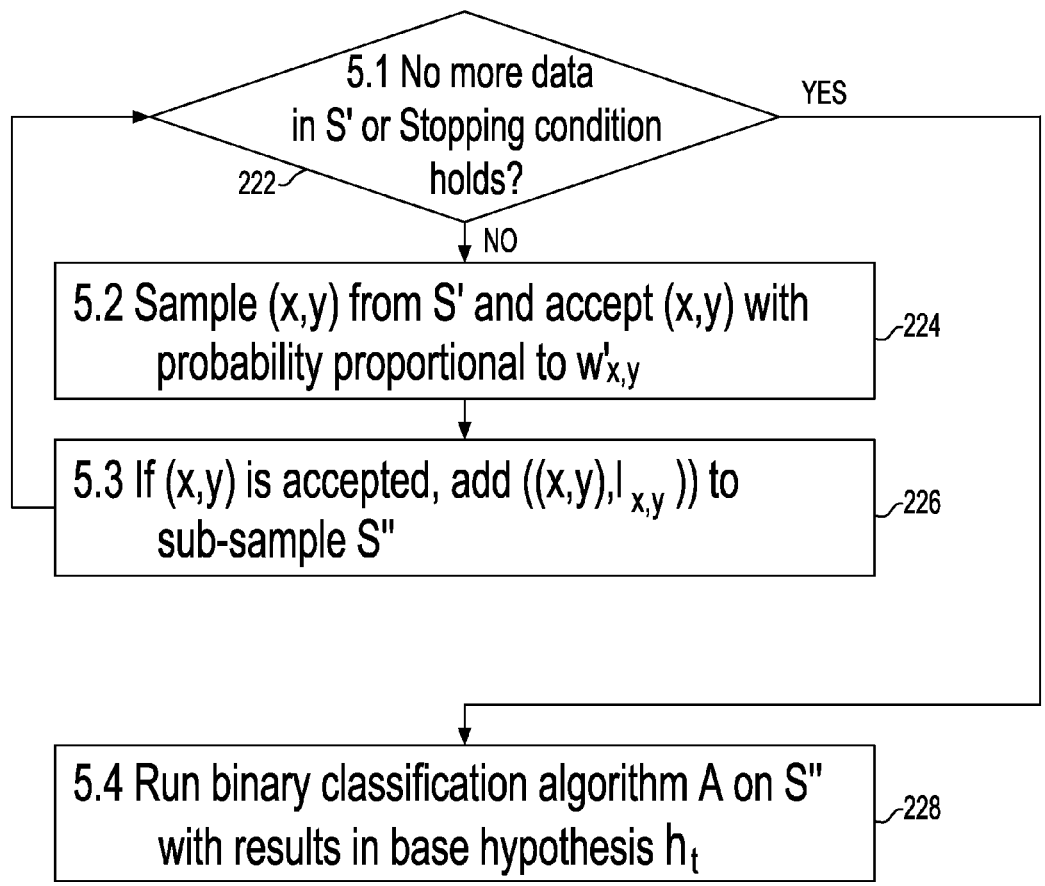# FIG. 2A / FIG. 2B

```
label = 0
|   dst_bytes <= 15
|   |   dst_host_serror_rate <= 0.57: 0 (26.0/1.0)
|   |   dst_host_serror_rate > 0.57
|   |   |   flag = SF: 1 (3.0)
|   |   |   flag = S0: 0 (2.0)
|   |   |   flag = SH: 1 (0.0)
|   |   |   flag = S1: 1 (0.0)
|   |   |   flag = S2: 1 (0.0)
|   |   |   flag = S3: 1 (0.0)
|   |   |   flag = REJ: 1 (0.0)
|   |   |   flag = RSTO: 1 (0.0)
|   |   |   flag = RSTR: 1 (0.0)
|   |   |   flag = RSTOS0: 1 (0.0)
|   |   |   flag = OTH: 1 (0.0)
|   dst_bytes > 15: 1 (22.0/2.0)
label = 1
|   srv_diff_host_rate <= 0
|   |   dst_bytes <= 15: 1 (24.0)
|   |   dst_bytes > 15: 0 (6.0/1.0)
|   srv_diff_host_rate > 0: 0 (9.0)
label = 2
|   wrong_fragment <= 0
|   |   land = 0: 0 (28.0/2.0)
|   |   land = 1: 1 (2.0)
|   wrong_fragment > 0: 1 (8.0)
label = 3: 0 (2.0/1.0)
label = 4
|   dst_host_same_src_port_rate <= 0.18: 0 (5.0)
|   dst_host_same_src_port_rate > 0.18: 1
(17.0/1.0)
```

FIG. 5

METHODS AND SYSTEMS FOR COST-SENSITIVE BOOSTING

FIELD OF THE INVENTION

The present disclosure generally relates to machine learning and data mining, and particularly to "cost-sensitive classification" in which constructs are based upon a training data set, a classifier that takes into account the cost information provided for its classification decisions, using as a sub-procedure a possibly weaker classification algorithm which may be insensitive to the cost information.

BACKGROUND OF THE INVENTION

Cost-sensitive classification is a critical component in many real world applications in business decision support and manufacturing among others, in which different types of misclassification can have significantly different costs associated with them. Cost-sensitive learning involves classification tasks in presence of varying costs associated with different types of misclassification, such as false-positives and false-negatives. A large number of practical application domains motivate cost-sensitive learning, as documented in the literature: examples include targeted marketing, medical diagnosis, fraud detection, credit rating, network intrusion detection, anomaly detection in manufacturing processes, to name a few. There has been considerable theoretical as well as empirical research on this topic, both in the machine learning and data mining communities (see, for example, B. Zadrozny and C. Elkan, "Learning and making decisions when costs and probabilities are both unknown", Proceedings of the Seventh International Conference on Knowledge Discovery and Data Mining, pp. 204-213, ACM Press, 2001, P. Chan and S. Stolfo, "Toward scalable learning with non-uniform class and cost distributions", Proceedings of the Fourth International Conference on Knowledge Discovery and Data Mining, pp. 164-168, 1998, and B. Zadrozny, J. Langford, and N. Abe, "Cost-sensitive learning by cost-proportionate example weighting", Proceedings of the Third IEEE International Conference on Data Mining, pp. 435-442, 2003).

For pure classification, extensive past research has established that the family of boosting methods, including AdaBoost (Y. Freund and R. E. Schapire. A decision-theoretic generalization of on-line learning and an application to boosting. Journal of Computer and System Sciences, 55(1):119-139, 1997) and its many variations, enjoys superior empirical performance and strong theoretical guarantees. For cost-sensitive learning, however, there has not been a comprehensive study of relative merits of different boosting algorithms. Some attempts have been made to extend the AdaBoost algorithm into cost-sensitive versions, e.g. AdaCost (W. Fan, S. J. Stolfo, J. Zhang, and P. K. Chan. AdaCost: Misclassification cost-sensitive boosting. In Proceedings of the Sixteenth International Conference on Machine Learning, pages 97-105, 1999.) and CSB2 (K. M. Ting. A comparative study of cost-sensitive boosting algorithms. In Proceedings of the Seventeenth International Conference on Machine Learning, pages 983-990, 2000), but the aggressive weight updating scheme based on the exponential loss posed difficulties in balancing the contributions of the cost information and boosting's focus on misclassification error. More recently, an effort was made to bridge this gap with the proposal of a cost-sensitive boosting method called GBSE (. Abe, B. Zadrozny, and J. Langford. An iterative method for multi-class cost-sensitive learning. In KDD'04: Proceedings of the tenth ACM SIGKDD international conference on Knowledge discovery and data mining, pages 3-11, New York, N.Y., USA, 2004. ACM), inspired by the framework of gradient boosting, but only a partial theoretical justification was provided, where the proof of convergence was given for a variant of the proposed method.

BRIEF SUMMARY OF THE INVENTION

A method and system for multi-class, cost-sensitive learning based on iterative example weighting schemes applied to a chosen data set are provided. The method, in one aspect, may comprise a) obtaining an expanded data set, which is defined by enhancing each example in an original data set with as many data points as there are possible labels for any single instance; b) repeatedly selecting one or more sub-samples from the expanded data set using weighted sampling according to a predetermined example weighting scheme, in which each labeled example is given a weight said weight being equal to an original misclassification cost for said labeled example times p−1 norm of average prediction of current hypotheses on said labeled example; c) executing a component classification learning algorithm on the sub-sample obtained in step b) and obtaining a hypothesis representing a classifier; and d) outputting all classifier representations obtained in iterations of steps b) and c), each of said classifier representations being a representation of classifier.

In another aspect, a method for multi-class, cost-sensitive learning based on iterative example weighting schemes applied to a chosen data set, may comprise a) obtaining an expanded data set, which is defined by enhancing each example in an original data set with as many data points as there are possible labels for any single instance; b) repeatedly calling a component importance-weighted classification learning algorithm with the expanded data set, with example weights, in which each labeled example is given a weight which equals an original misclassification cost for said labeled example times p−1 norm of average prediction of current hypotheses on said labeled example; and c) outputting all classifier representations obtained through iterations of step b), each of said classifier representations being a representation of classifier and together representing an average classifier.

A program storage device readable by a machine, tangibly embodying a program of instructions executable by the machine to perform above described methods may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2A is a flow diagram showing the logic for another embodiment implementation of step 5 of the flow diagram in FIG. 2.

FIG. 2B is a flow diagram showing the logic for another embodiment implementation of step 5 of the flow diagram in FIG. 2.

FIG. 5 is an example of a decision tree to illustrate the process implemented by the present disclosure.

DETAILED DESCRIPTION

Figure 1:
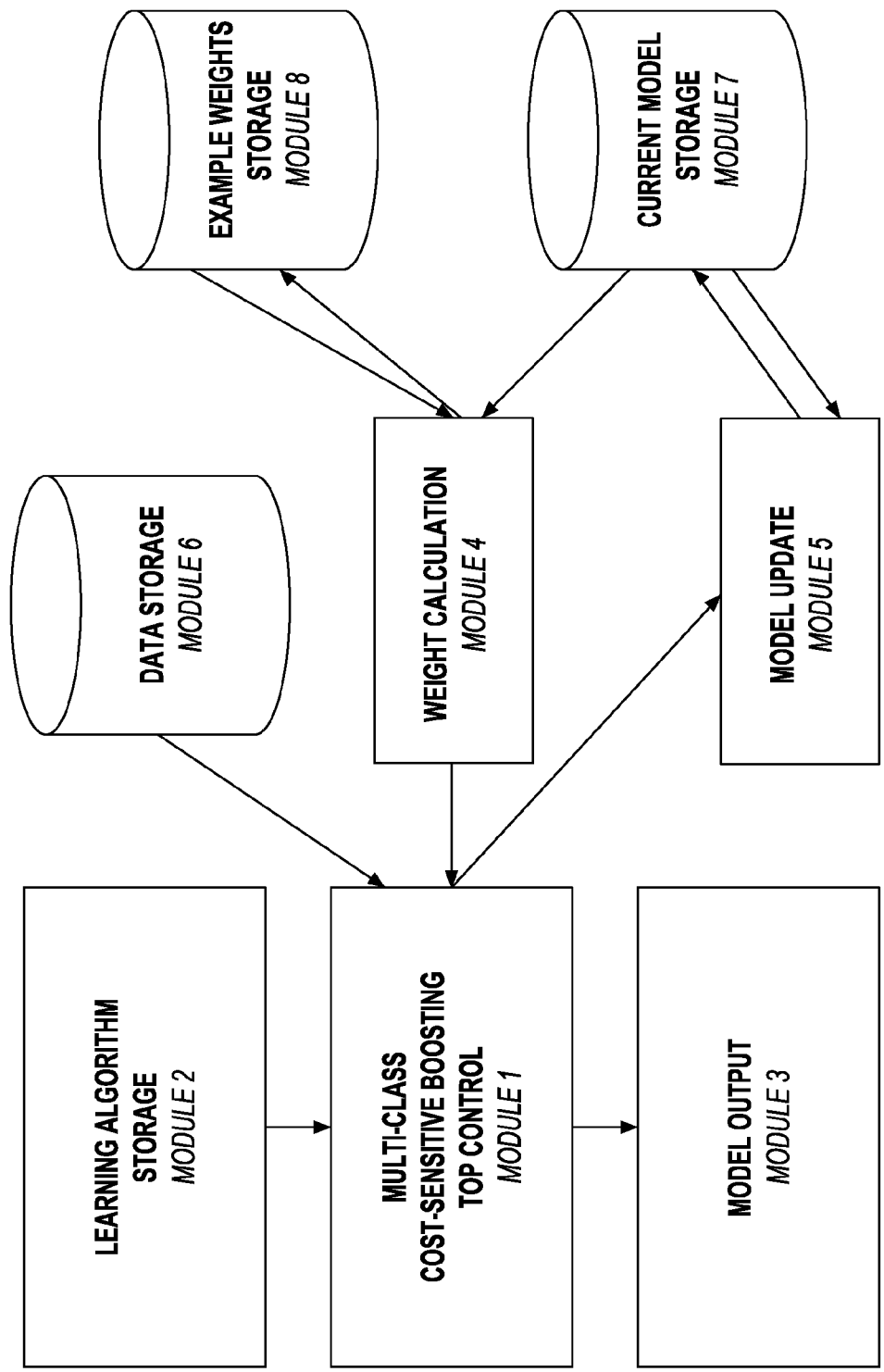
FIG. 1 is a block diagram showing the architecture of a system for cost-sensitive boosting in one embodiment of the present disclosure.

The present disclosure provides a class of new cost-sensitive boosting methods by applying the theory of gradient boosting to a family of p-norm cost functionals. The p-norm cost functionals include, as special cases, the linear cost (expected cost) and the squared loss based cost functional. The inventive methodology may fall under a family of general multi-class cost-sensitive boosting methods, which use binary weak classifiers, enjoying some theoretical performance guarantee, in the form of a proof of convergence and the rate thereof.

The system and methods solve multi-class cost-sensitive learning problems by using iterative example weighting schemes derived with respect to the proposed cost functionals, in conjunction with a binary classification algorithm. One embodiment of the methods works by iteratively applying weighted sampling from an expanded data set, which is obtained by enhancing each example in the original data set with as many data points as there are possible labels for any single instance, and where each non-optimally labeled example is given the weight which equals a half times the original misclassification cost for the said labeled example times the p−1 norm of the average prediction of the current hypotheses, while each optimally labeled example is given the weight which equals the sum of the weights for all the non-optimally labeled examples for the same instance. It then calls the component classification algorithm on a modified binary classification problem in which each example is itself already a labeled pair, and its (meta) label is 1 or 0 depending on whether the example is optimal or not, respectively. It then outputs a classifier hypothesis which is the average of all the hypotheses output in the respective iterations.

In one aspect, the methods of the present disclosure are based on gradient boosting with "p-norm" cost functionals, with p strictly greater than one. P-norm cost functionals are used as the objective loss function. We derive an example weighting scheme with respect to the p-norm cost functionals, that is, each example is weighted according to the gradient of the cost functional evaluated at that example. The method iteratively samples examples using weighted sampling according to these weights, trains a component classifier using the sub-sample, aggregates all classifiers generated in the past and current iterations to obtain an aggregated classifier, referred to here as "ensemble hypothesis", and then updates the example weights. The use of the p-norm cost functional forces the example weights to be dependent on the aggregated classifier at each iteration, and by virtue of this dependence, the method is able to select data that are "more important to classify correctly" to train the component classifier relative to the predictive behavior of the current ensemble hypothesis.

The p-norm gradient boosting scheme can be combined with a couple of example weighting methods in order to allow the use of binary classifiers as "component" learners. A method in one embodiment of the present disclosure makes use of example weights that are derived using the so-called "pseudo-loss", in which the weight for the correct class is always a half of the sum of the weights for all the labels for that instance, and the weights for all other labels are normalized to sum to a half of the sum of the weights for all the labels for that instance.

A method in another embodiment of the present disclosure uses example weights that are further modified, using the equivalence relationship between the p-norm loss and the pseudo-loss with modified weights for the component learner, so that the weight for each example equals the original weight for that example minus the misclassification cost times the average, per label, p−1 norm of the prediction of the current ensemble hypothesis on that instance.

Cost-sensitive Learning and Related Concepts

We first describe the framework for cost sensitive learning along with related concepts and notation used in the rest of the description.

We consider a general formulation of cost-sensitive (multiclass) classification where a cost function $C(x,y_1,y_2)$ is used to specify the cost of predicting that an example x belongs to class $y_1$ when the correct label is $y_2$. This general formulation allowing costs to depend on individual instances was first proposed by Zadrozny & Elkan (B. Zadrozny and C. Elkan. Learning and making decisions when costs and probabilities are both unknown. In Proceedings of the Seventh International Conference on Knowledge Discovery and Data Mining, pages 204-213. ACM Press, 2001).

Formally, denote by X the input space and by Y the set of classes. Let k be the number of classes, i.e., k=|Y|. We assume that examples $(x,\vec{C})$ are drawn from a distribution D over $X \times R^{+^k}$. Here $\vec{C}$ is the vector of costs $C_{x,y}=C(x,y,y^*)$, where y* denotes the label with minimum cost and y is in Y. We note that the above formulation allows C to depend on the individual instances, x, generalizing the common formulation in terms of cost matrices.

Based on a sample $S=\{x,\vec{C}\}$ drawn independently and identically distributed (i.i.d.) from D, we wish to find a classifier $h:X \to \{1, \ldots, k\}$ which minimizes the expected cost $E_{(x,\vec{C}) \sim D}[C_{x,h(x)}]$. Without loss of generality we assume that the costs are normalized so that $\forall x \in X C_{x,y^*}=C_{x,y^*,y^*}=0$. Then the problem is equivalent to the minimization in terms of misclassification cost, i.e., $\mathrm{argmin}_{h \in H} E_{(x,\vec{C}) \sim D}[C_{x,h(x)} I(h(x) \neq y^*)]$, where $I(\cdot)$ denotes the indicator function, which equals 1 when its input holds and 0 otherwise.

Our proposed methods will make use of importance weighted classification, which we review below. In importance-weighted classification, examples of the form (x,y,w) are drawn from a distribution D over $X \times Y \times R^+$. Given a training set $S=\{(x,y,w)\}$ the goal is to find a classifier $h:X \to Y$ having minimum expected weighted misclassification error: $E_{(x,y,w) \sim D}[w \cdot I(h(x) \neq y)]$.

Description of the Methodology

Our methodology is based on the minimization of a convex objective: a p-norm based cost functional, which we now introduce and provide some motivation for.

The aforementioned concepts were introduced in terms of functional hypotheses h, i.e. h:X→Y but also apply to stochastic hypotheses, namely hypotheses h:X×Y→[0,1] satisfying the stochastic condition $$\forall x \in X: \sum_{y \in Y} h(y \mid x) = 1.$$

In particular a stochastic cost-sensitive learner is expected to minimize $E_{(x,\vec{C}) \sim D}[C_{x, argmax_y h(y|x)}]$. Since the distribution D is unknown, one could consider methods which, given a training sample, attempt to minimize the sample average $$\hat{E}_{(x,\vec{C}) \sim S}[C_{x, argmax_y h(y|x)}] = \frac{1}{|S|} \sum_{(x,\vec{C}) \in S} C_{x, argmax_y h(y|x)} \quad (1)$$

Such procedures, however, are computationally intractable for many hypothesis classes, one major obstacle being the non-convexity of the objective.

To remedy this issue, the learning methods proposed by this disclosure are based on the minimization of a convex surrogate of the objective. Notice that $$\max_y h(y \mid x) = \|h(y \mid x)\|_\infty.$$

Thus $C_{x, argmax_y h(y|x)} = \sum_y \left( \frac{h(y \mid x)}{\|h(y \mid x)\|_\infty} \right)^\infty C_{x,y},$ which can be approximated by $$\sum_y \left( \frac{h(y \mid x)}{\max_y h(y \mid x)} \right)^p C_{x,y}, \; p \geq 1.$$

Since $\max_y h(y|x) \geq 1/k$, it is natural to consider the minimization of the following convexification of the original objective of Eq. (1):

$$\operatorname{argmin}_h \frac{1}{|S|} \sum_{(x,\vec{C}) \in S} \sum_y (h(y \mid x))^p C_{x,y}, \; p \geq 1 \quad (2)$$

We expect that the larger p is the closer it approximates Eq. (1).

The minimization of the convex objective as defined in Eq. (2) is carried out by adopting a boosting-style functional gradient descent approach (see L. Mason, J. Baxter, P. Barlett, and M. Frean. "Boosting algorithms as gradient descent." In *Advances in Neural Information Processing systems* 12, pages 512-158, 2000) combined with a stochastic interpretation of ensemble hypotheses. We now elaborate on our methodology.

Given multiple functional hypotheses $h_t$, t=1, . . . , T, we define a stochastic ensemble hypothesis H as the conditional distribution resulting from the mixture of the component hypotheses, namely, $$\forall x \in X, \forall y \in Y \; H(y \mid x) = \frac{1}{T} \sum_{t=1}^T I(h_t(x) = y).$$

To solve Eq. (2), an incremental algorithm is used, which, at each round t, updates the current ensemble hypothesis by the convex combination of the previous ensemble hypothesis $H_{t-1}$ and a new hypothesis $h_t$ i.e., by setting $H_t(y|x)=(1-\beta)H_{t-1}(y|x)+\beta I(h_t(x)=y)$, where $\beta \in [0,1]$. Here a hypothesis, $h_t$, that is added in each iteration is referred to as a "weak hypothesis", which is output by the component learner, which is also referred to as "weak learner" or a "weak learning algorithm."

Let $f_t(y|x)=I(h_t(x)=y)$ and let $\Lambda$ denote the gradient operator. The new hypothesis $h_t$ is output by a weak learner so as to approximately maximize $$-\langle \nabla L(H_{t-1}), f - H_{t-1} \rangle$$

where $$L(H) = \sum_{x \in X} \sum_{y \in Y} H(y \mid x)^p C_{x,y}.$$

By the Fréchet-like differentiability condition of the p-norm cost functional considered $$\langle \nabla L(H_{t-1}), f - H_{t-1} \rangle = \sum_{x,y} p H_{t-1}(y \mid x)^{p-1} C_{x,y} (f(y \mid x) - H_{t-1}(y \mid x)).$$

So at each iteration t, the given weak learner should try to choose $h_t$ so as to approximately minimize $$\sum_{x \in X} \sum_{y \in Y} w_{x,y}(I(h_t(x) = y)), \text{ where}$$

$$w_{x,y} = H_{t-1}(y|x)^{p-1} C_{x,y}. \quad (3)$$

This optimization problem with respect to these particular weights is the basis of the family of methods proposed by in the present disclosure. We now consider implementing the optimization problem of Eq. (3)

Learning Methods Based on Multi-class Base Classifier

One possible way to implement the optimization problem of Eq. (3) is to use a multi-class classifier as the base learner. A straightforward multi-class method to find a new weak hypothesis consists in using a weak learner minimizing the weighted classification error for the expanded data set $S'= \{(x,y) | \exists (x,\vec{C}) \in S \text{ and } y \in Y\}$ and weights $\max_y w_{x,y} - w_{x,y}$. (It was shown in (N. Abe, B. Zadrozny, and J. Langford. "An iterative method for multi-class cost-sensitive learning. In KDD '04: Proceedings of the tenth ACM SIGKDD international conference on Knowledge discovery and data mining, pages 3-11, New York, N.Y., USA, 2004. ACM.), that this also minimizes Eq. (3).)

We remark that for linear loss (p=1), the resulting procedure is identical to the DSE Method (N. Abe, B. Zadrozny, and J. Langford. "An iterative method for multi-class cost-sensitive learning. In KDD '04: Proceedings of the tenth ACM SIGKDD international conference on Knowledge discovery and data mining, pages 3-11, New York, N.Y., USA, 2004. ACM.), as the weights reduce to $\max_y C_{x,y} - C_{x,y^*}$, which are constant over the iterations. Notice that with this expanded dataset formulation all the labels are effectively treated as correct labels, albeit to varying degrees due to having different weights, resulting in sub-optimal performance in practice. In subsequent developments, we address this issue by using binary base learning procedures instead of multi-class, in a number of different ways, resulting in various concrete algorithms implementing the weighting scheme of Eq. (3).

$L_p$ Cost Sensitive Boosting

When converting multi-class into binary classification, it is useful to consider the notion of relational hypotheses, namely those that are relations over $X \times Y$: $h: X \times Y \to \{0,1\}$.

Consider again the optimization problem and the corresponding weights in Eq. (3). Notice that $C_{x,y^*} = 0$ implies $w_{x,y^*} = 0$, and hence the optimization problem of Eq. (3) effectively involves the dataset $$B = \{(x,y) | x \in X, y \in Y, y \neq y^*\} \quad (5)$$

For stochastic hypotheses, $(x,y^*)$ is indirectly taken into account, since for any such hypothesis f, for all x, $$f(y^* | x) = 1 - \sum_{y \in Y, y \neq y^*} f(y | x).$$

For relational hypotheses $h: X \times Y \to \{0,1\}$, however, the minimization of Eq. (3) can be achieved simply by assigning $h(x,y) = 0$ everywhere.

The pseudo-loss (see Y. Freund and R. E. Schapire. "A decision-theoretic generalization of on-line learning and an application to boosting." Journal of Computer and System Sciences, 55(1):119-139, 1997.) is thus introduced as a way to explicitly incorporate $h(x,y^*)$ in the objective:

$$\frac{1}{2} \sum_{(x,y) \in B} w_{x,y}(1 - h(x, y^*) + h(x, y)).$$

We can reformulate this minimization problem as a weighted binary classification problem by converting the weighted sample $\{(x,y,w_{x,y}), x \in X, y \in Y\}$ into $$S_2 = \{((x, y), l, w'_{x,y}), x \in X, y \in Y\}, \quad (6)$$

where $$\begin{cases} w'_{x,y} = \dfrac{w_{x,y}}{2} \text{ and } l = 0 & \forall (x, y) \in B \\ w'_{x,y^*} = \dfrac{\sum_{y \neq y^*} w_{x,y}}{2} \text{ and } l = 1 & \forall x \in X \end{cases}$$

Figure 2:
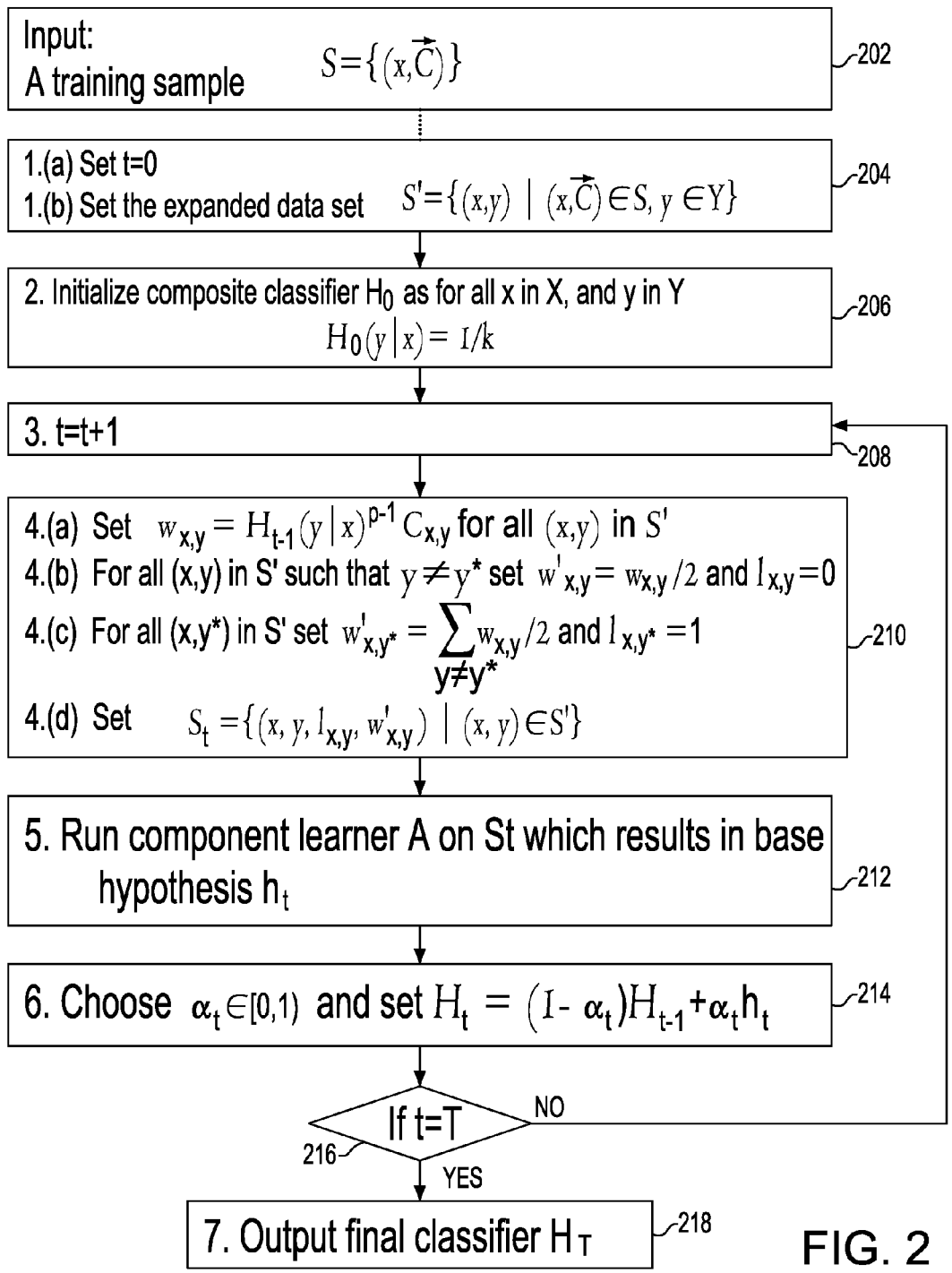
FIG. 2 is a flow diagram showing the logic of a method in one embodiment for cost-sensitive boosting, for example, implemented on the system shown in FIG. 1.

The component learner is then to find a relational hypothesis h that minimizes the weighted error on $S_2$, i.e., $$\sum_{x \in X} \sum_{y \in Y} w'_{x,y} I(h(x, y) \neq l),$$

which is equivalent to minimizing the pseudo loss. The resulting procedure, L_p-CSB (Cost Sensitive Boosting with p-norm Loss) is provides a method in one embodiment of the present disclosure as shown in FIG. 2 and FIG. 2A.

L_p-Cost Sensitive Boosting with Pseudo-Loss Adjustment

Our next method is motivated by characterizing the relationship between the pseudo-loss and the original loss $$l_w(h) = \sum_{x \in X, y \in Y} w_{x,y} h(x, y)$$

as follows.

For convenience we omit the factor ½ in the pseudo-loss and let $$\tilde{l}_w(h) = \sum_{(x,y) \in B} w_{x,y}(1 - h(x, y^*) + h(x, y)),$$

since the minimizer is unaffected. Notice that $$\tilde{l}_w(h) = l_w(h) + \sum_{x \in X} \left( \left( \sum_{y \in Y} w_{x,y} \right) (1 - h(x, y^*)) \right).$$

Hence if for some hypothesis h, $\tilde{l}_w(h) = \epsilon$ for some positive $\epsilon$ then $l_w(h) \leq \epsilon$. So an hypothesis with small pseudo-loss has small original loss as well.

For stochastic hypotheses, the equivalence between pseudo loss and original loss is expressed by the following proposition.

Proposition 1.

For any stochastic hypothesis $h: X \times Y \to \{0, 1\}$ $$l_w(h) = \tilde{l}_{\tilde{w}}(h) \text{ if } \forall (x, y) \in B \, \tilde{w}_{x,y} = w_{x,y} - \frac{1}{k} \sum_{y' \neq y^*} w_{x,y'}$$

where B is as defined in Eq. (5).

Figure 3:
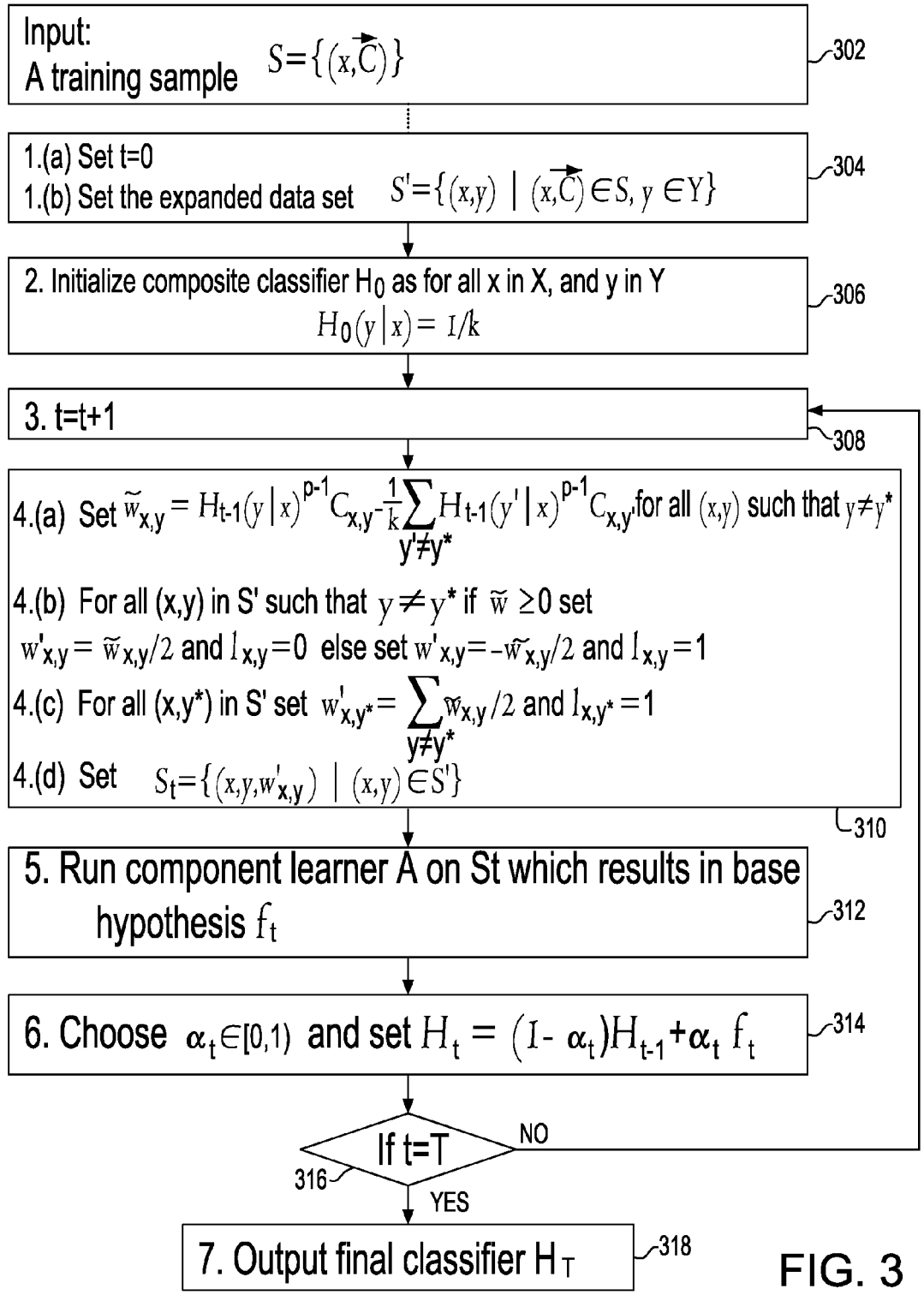
FIG. 3 is a flow diagram showing the logic of a method in another embodiment for cost-sensitive boosting, for example, implemented on the system shown in FIG. 1.
Figure 3A:
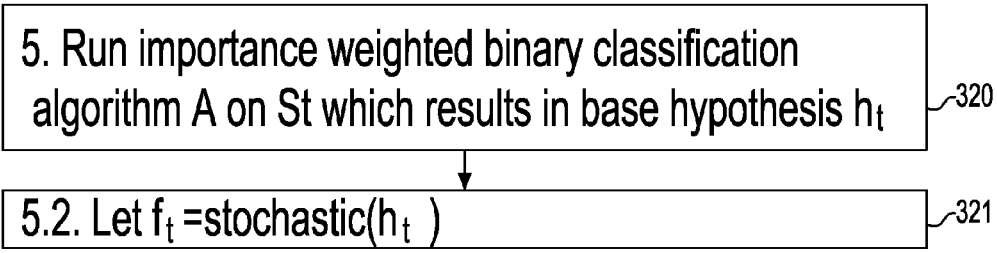
FIG. 3A is a flow diagram showing the logic for another embodiment implementation of step 5 of the flow diagram in FIG. 3.

Proposition 1 provides a method in another embodiment, L_p-CSB-PA (Cost Sensitive Boosting with p-norm Loss and Pseudo-loss Adjustment), which is similar to L_p-CSB but where the weights $w_{x,y}$ are replaced by $\tilde{w}_{x,y}$, and stochastic hypotheses are required. Notice that the weights $\tilde{w}_{x,y}$ can be negative, which implies that the component learner is asked to minimize weighted misclassification with positive and negative weights. This is a perfectly valid optimization problem, but implementing it using a standard weak learner requires a transformation: converting each example $((x,y),0,\tilde{w}_{x,y})$ for which $w'_{w,y} < 0$ into $((x,y),1,-\tilde{w}_{x,y})$. The method is shown in FIG. 3 and FIG. 3A.

Note that when p=2, that is under squared loss, the weights become $$\tilde{w}_{x,y} = H_{t-1}(y | x) C_{x,y} - \frac{1}{k} C_{H_{t-1}}(x),$$

where $$C_{H_{t-1}}(x) = \sum_{y \in Y} H_{t-1}(x, y) C_{x,y}.$$

These weights are similar (though different) to the weighting scheme of the GBSE-t algorithm (N. Abe, B. Zadrozny, and J. Langford. "An iterative method for multi-class cost-sensitive learning. In *KDD* '04: Proceedings of the tenth ACM SIGKDD international conference on Knowledge discovery and data mining, pages 3-11, New York, N.Y., USA, 2004. ACM.), in the sense that for each sample (x,y) both weighting schemes involve relating the cost at (x,y) to the average cost incurred by the current hypothesis at x divided by the number of classes.

Theoretical Guarantees

We now state theoretical results that show convergence of our proposed methods, and provide rates of convergence.

Figure 4:
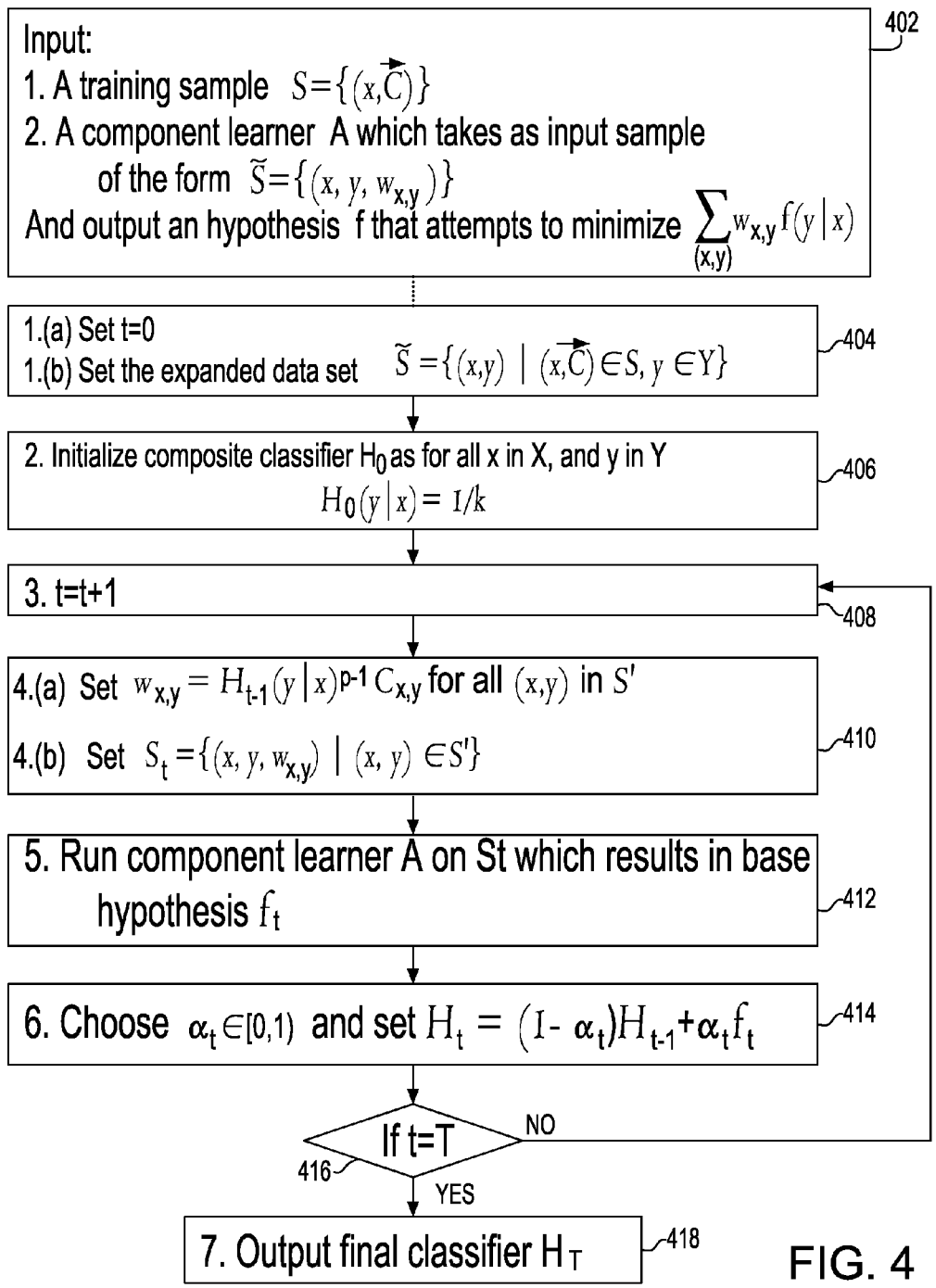
FIG. 4 is a flow diagram showing the logic of a method in yet another embodiment for cost-sensitive boosting, for example, implemented on the system shown in FIG. 1.

For simplicity we consider the "abstracted" version of our methods illustrated in FIG. 4, which is expressed in terms of the original optimization problem stated in Eq. (3). Denote by F the class of base hypotheses and by H the set of convex combinations of hypotheses in F.

At each round t, the new hypothesis $f_t$ returned by the weak learner attempts to minimize $$\sum_{x,y} w_{x,y} f(y|x) \text{ with } w_{x,y} = H_{t-1}(y|x)^{p-1} C_{x,y}.$$

The following theorem characterizes convergence in terms of the relative performance of the selected weak hypothesis in completing that task compared to that of the current composite hypothesis $H_{t-1}$.

Theorem 1.

Consider the method *Lp-CSB-A*. Assume that at each iteration *t* the new hypothesis $f_t$ returned by the weak learner is such that $\sum_{x,y} w_{x,y}(f_t(y|x) - H_{t-1}(y|x)) \leq -\varepsilon_t$, with $\varepsilon_t \geq 0$.

Pick $$\alpha_t = -\frac{\sum_{x,y} pH_{t-1}(y|x)^{p-1} C_{x,y}(f_t(y|x) - H_{t-1}(y|x)) \leq -\varepsilon_t}{M\|f_t - H_{t-1}\|^2},$$

where $M = \sup_{x \in X, y \in Y} C_{x,y} p(p-1)(2^{p-2})$.

Then the algorithm converges to the global minimum of the cost *L* over $\mathcal{H}$.

The weak learning assumption required by the theorem is reasonable as $f_t$ is specifically picked as an attempt to minimize $$\sum_{x,y} w_{x,y}(f_t(y|x)),$$

while $H_{t-1}$ is not, and hence it is reasonable to expect the former to outperform the latter.

The next theorem considers approximate minimization of $$\sum_{x,y} w_{x,y} f(y|x)$$

over the prescribed class F of weak hypotheses as the weak learning condition, and provide some convergence rates for the Lp-CSB-A procedure.

Theorem 2.

Assume that at each iteration *t* of the algorithm L_p-*CSB-A* the component learner $$\sum_{x,y} w_{x,y}(f_t(y|x)) \leq \inf_f \sum_{x,y} w_{x,y}(f(y|x) + \varepsilon_t, \text{ where } \varepsilon_t \leq \frac{M}{2(t+1)^2}.$$

Pick $\alpha_t$ as in Theorem 1. Then for all *t*

> 0 we have for $H_t$ obtained by L_p-*CSB-A* that $L(H_t) - \inf_{H \in \mathcal{H}} L(H) \leq \frac{9M}{t+2}$, where *M* is as in Theorem 1.

Referring now to the drawings, and more particularly to FIGS. 1-5, there are shown several exemplary embodiments of the method and structures of the present disclosure. FIG. 1 illustrates an exemplary embodiment of the system in accordance with the present disclosure. The system includes a cost-sensitive boosting top control module 1, a learning algorithm storage module 2, a model output module 3, a weight calculation module 4, a model update module 5, a data storage module 6, a current model storage module 7, and an example weights storage module 8.

The cost-sensitive boosting control module 1 controls the entire flow of the modeling process. The learning algorithm storage module 2 stores the algorithmic description of the weak learner. The weight calculation module 4 computes the current weights based upon the current model stored in the current model storage module 7, the data stored in the data storage module 6, and the example weights stored in the example weights storage module 8, for example, in accordance with the methods illustrated in FIG. 2 and FIG. 3. The current model storage module 8 receives the model from the model update module 5 and stores the model. The model output module 3 outputs the model produced by the multi-class cost-sensitive boosting top control module.

FIG. 2 and FIG. 2A provide a flow chart of a preferred embodiment of the present disclosure. At 202, the method L-p CSB receives as input a set of training examples S={(x,$\vec{C}$)}. At 204, the iteration counter t is set to 0 (step 1.(a)), and the expanded dataset is computed such that S'={(x,y)|(x,$\vec{C}$)∈S,y∈Y}. At 206, the composite classifier at iteration t=0 is initialized such that for all x in X and y in Y $H_0(y|x)=1/k$, k being the number of classes. At 208, the iteration counter t is increase by one. At 210, in step 4(*a*) the weights $w_{x,y}$ are computed for each example in the expanded data set S'. Those weights are subsequently used to compute weights $w'_{x,y}$ in a way depending on whether y is the optimal class, in which case a binary label $l_{x,y}$ is also defined and set to 1 (see step 4(*c*)) or not, in which case a binary label $l_{x,y}$ is also defined and set to 0 (see step 4(*b*)). In step 4(*d*), a sample St is constructed comprising the examples in S', along with their labels $l_{x,y}$, and the weights $w'_{xy}$. This sample St is given as input to a component learner.

At 212, step 5 may be performed according to two variants shown in FIG. 2A and FIG. 2B. The first variant (FIG. 2A), comprises using an importance weighted classification algorithm as weak learner directly on St to obtain a base hypothesis $h_t$ (step 5.4) as shown at 220.

The second variant (FIG. 2B), comprises using a binary classifier on a sub-sample S", where S" is constructed as follows. According to test 5.1 at 222, while there are examples in S' or a certain stopping condition is not met (for instance a condition on the size of S"), at 224, examples (x,y) are sampled from S', accepted with probability proportional to $w'_{xy}$ (see step 5.2), and at 226, if (x,y) is accepted, ((x,y), $l_{xy}$) is added to sub-sample S" (step 5.3). When condition 5.1 is met, at 228, a S" is complete and a binary classification algorithm is run on S", which results in base hypothesis $h_t$ (step 5.4).

Referring back to FIG. 2, we then proceed to step 6 at 214, where a coefficient $\alpha_t \epsilon [0,1)$ is picked and the composite hypothesis is updated as the convex combination of the composite hypothesis at iteration t−1 and the base hypothesis $h_t$: $H_t=(1-\alpha_t)H_{t-1}+\alpha_t h_t$.

Then if the iteration number equals T, the final classifier $H_T$ is output, otherwise the method proceeds to step 3 at 208, in which the iteration counter is incremented by 1.

Figure 3B:
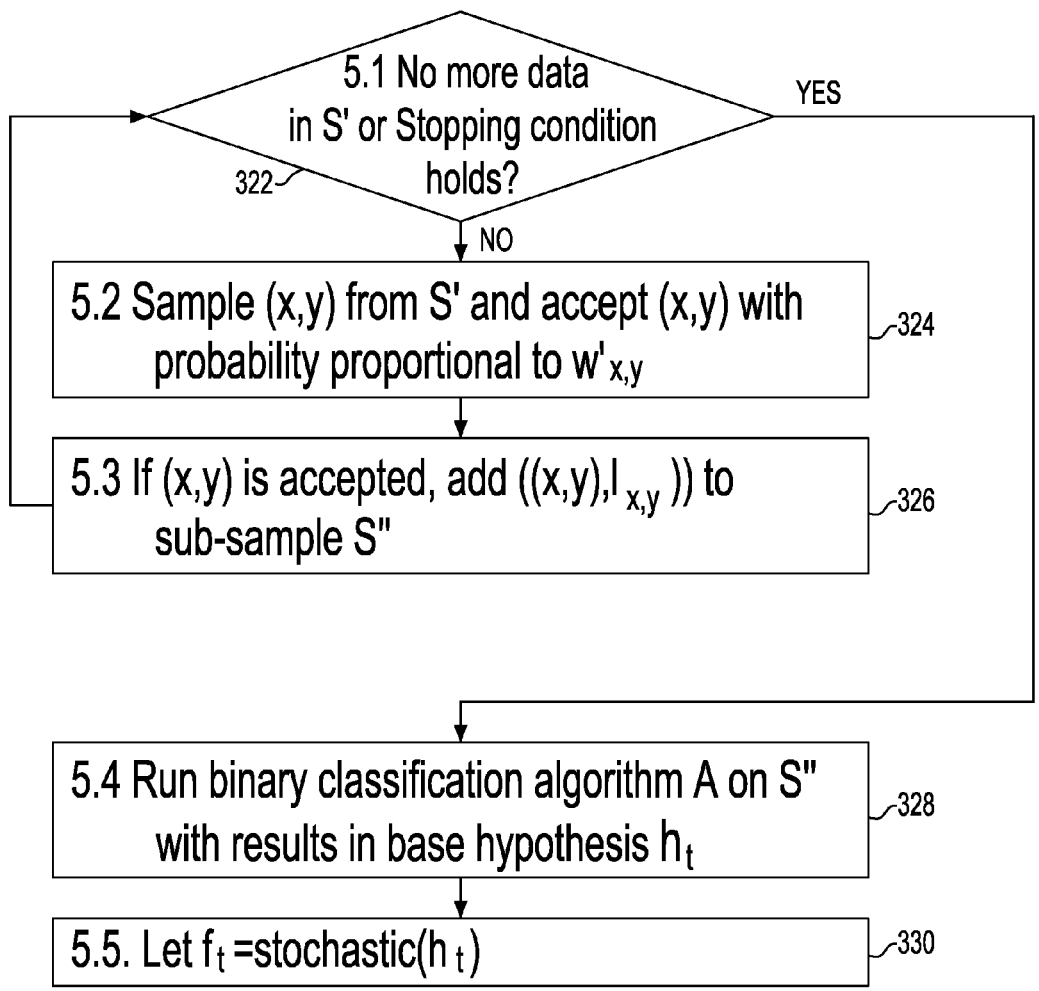
FIG. 3B is a flow diagram showing the logic for yet another embodiment implementation of step 5 of the flow diagram in FIG. 3.

The flow charts of FIG. 3, FIG. 3A and FIG. 3B illustrate an alternative embodiment of the present disclosure, which corresponds to the method "Lp-CSB-PA" described herein. The procedure is similar, the difference with FIG. 2 being in steps 4(a)-(e) where the weights why are computed in a different way, and in view of consideration that the weak hypothesis ht may need to be stochastic, which is reflected FIG. 3A and FIG. 3B (step 5.2 at 324, and step 5.5 at 330).

At 302, the method Lp-CSB-PA receives as input a set of training examples S={(x,$\vec{C}$)}. At 304, the iteration counter t is set to 0 (step 1.(a)), and the expanded dataset is computed such that S'={(x,y)|(x,$\vec{C}$)∈S,y∈Y}. At 306, the composite classifier at iteration t=0 is initialized such that for all x in X and y in Y $H_0(y|x)=1/k$, k being the number of classes. At 308, the iteration counter t is increase by one. At 310, the weights $w'_{xy}$ are computed for each example in the expanded data set S'. A sample St is constructed comprising the examples in S', along with their labels $l_{xy}$, and the weights $w'_{xy}$. This sample St is given as input to a component learner.

At 312, step 5 may be performed according to two variants shown in FIG. 3A and FIG. 3B. The first variant (FIG. 3A) comprises using an importance weighted classification algorithm as weak learner directly on St to obtain a base hypothesis $h_t$ as shown at 320. At 322, $h_t$ is converted to stochastic function.

The second variant (FIG. 3B) comprises using a binary classifier on a sub-sample S", where S" is constructed as follows. According to test 5.1 at 322, while there are examples in S' or a certain stopping condition is not met (for instance a condition on the size of S"), at 324, examples (x,y) are sampled from S', accepted with probability proportional to $w'_{xy}$ (see step 5.2), and at 326, if (x,y) is accepted, ((x,y),$l_{xy}$) is added to sub-sample S" (step 5.3). When condition 5.1 is met, at 328, a S" is complete and a binary classification algorithm is run on S", which results in base hypothesis $h_t$ (step 5.4). At 330, $h_t$ is converted to stochastic function.

Referring back to FIG. 3, we then proceed to step 6 at 314, where a coefficient $\alpha_t \epsilon [0,1)$ is picked and the composite hypothesis is updated as the convex combination of the composite hypothesis at iteration t−1 and the base hypothesis $h_t$: $H_t=(1-\alpha_t)H_{t-1}+\alpha_t h_t$.

Then at 316, if the iteration number equals T, the final classifier $H_T$ is output, otherwise the method proceeds to step 3 at 308, in which the iteration counter is incremented by 1.

FIG. 4 is a flow diagram showing the logic of a method in yet another embodiment for cost-sensitive boosting, for example, implemented on the system shown in FIG. 1. At 402, method Lp-CSB-A receives input of a training sample, a component learner. At 404, the iteration counter t is set to 0, and the expanded dataset is computed. At 406, composite classifier is initialized. At 408, the iteration counter t is increase by one. At 410, the weights are computed for each example in the expanded data set. At 412, component learner is run which results in base hypothesis. At 414, a composite hypothesis is updated.

FIG. 5 is an example of a decision tree to illustrate the process implemented by the present disclosure. The features mentioned in the decision tree are all described in the table of "Basic Features of Individual TCP Connections." The meaning of the decision tree is as follows: for example, if a connection satisfies dst_bytes<=15 and dst_host_serror_rate>0.57 and flag=SF then the tree assigns class 1 to label 0, namely the label is predicted to be 0.

Figure 6:
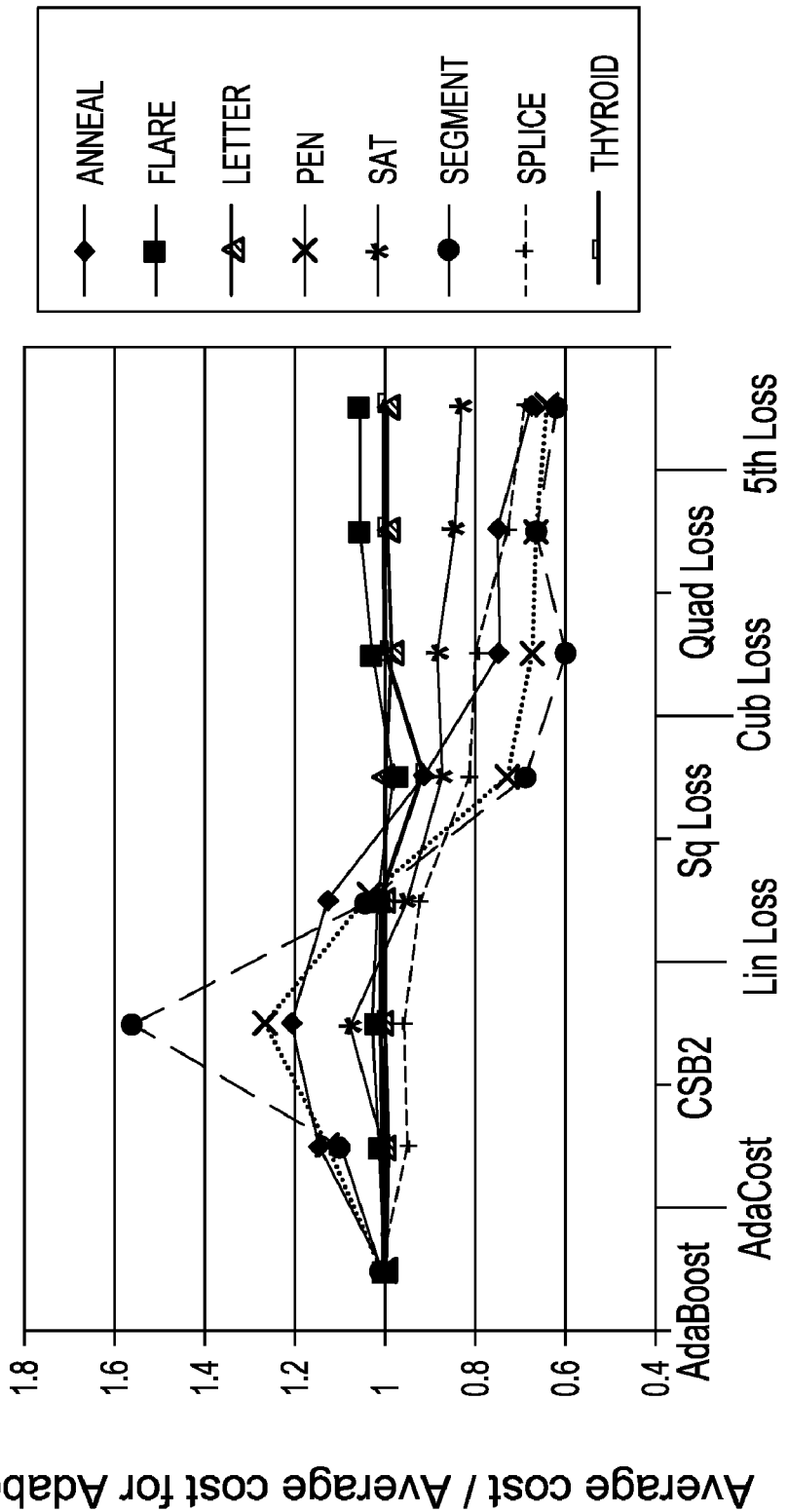
FIG. 6 illustrates examples of the results of comparing the proposed methodology with comparison methods.

FIG. 6 illustrates examples of the results of comparing the proposed methodology with comparison methods. It shows the average final costs normalized by that of AdaBoost. M2 for the uniform cost model for various methods: 1. AdaBoost.M2, 2. AdaCost, 3. CSB2, 4. Linear Loss, 5. Squared Loss, 6. Cubic Loss, 7. Quadratic Loss, 8. $5^{th}$-power Loss.

We now describe the features used in a specific data set, which will serve as an example to illustrate the models output by the Multi-class cost-sensitive Boosting Module 1. This dataset, which we call the "KDD cup 99" dataset, is taken from the UCI KDD archive (The "UCI KDD Archive", Information and Computer Science, University of California, Irvine, 1999).

| \multicolumn{3}{l}{Basic Features of Individual TCP Connections} | | |
|---|---|---|
| feature name | Description | type |
| Duration | length (number of seconds) of the connection | continuous |
| Protocol_type | type of protocol, e.g., TCP, UDP, etc. | discrete |
| Service | Network service on the destination, e.g., http, telnet, etc. | discrete |
| src_bytes | number of data bytes from source to destination | continuous |
| dst_bytes | number of data bytes from destination to source | continuous |
| Flag | normal or error status of the connection | discrete |
| Land | 1 if connection is from/to the same host/port; 0 otherwise | discrete |
| Wrong_fragment | number of "wrong" fragments | continuous |
| Urgent | number of urgent packets | continuous |

Content Features Within a Connection Suggested by Domain Knowledge

| feature name | description | type |
| --- | --- | --- |
| Hot | number of "hot" indicators | continuous |
| Num_failed_logins | number of failed login attempts | continuous |
| logged_in | 1 if successfully logged in; 0 otherwise | discrete |
| Num_compromised | number of "compromised" conditions | continuous |
| Root_shell | 1 if root shell is obtained; 0 otherwise | discrete |
| su_attempted | 1 if "su-root" command attempted; 0 otherwise | discrete |
| Num_root | number of "root" accesses | continuous |
| Num_file_creations | number of file creation operations | continuous |
| Num_shells | number of shell prompts | continuous |
| Num_access_files | number of operations on access control files | continuous |
| Num_outbound_cmds | number of outbound commands in an ftp session | continuous |
| is_hot_login | 1 if the login belongs to the "hot" list; 0 otherwise | discrete |
| is_guest_login | 1 if the login is a "guest" login; 0 otherwise | discrete |

Traffic Features Computed Using a Two-Second Time Window

| feature name | description | type |
| --- | --- | --- |
| Count | number of connections to the same host as the current connection in the past two seconds<br>Note: The following features refer to these same host connections. | continuous |
| serror_rate | % of connections that have "SYN" errors | continuous |
| rerror_rate | % of connections that have "REJ" errors | continuous |
| Same_srv_rate | % of connections of the same service | continuous |
| diff_srv_rate | % of connections of different services | continuous |
| srv_count | number of connections to the same service as the current connection in the past two seconds<br>Note: The following features refer to these same-service connections. | continuous |
| srv_server_rate | % of connections that have "SYN" errors | continuous |
| srv_rerror_rate | % of connections that have "REJ" errors | continuous |
| srv_diff_host_rate | % of connections to different hosts | continuous |

As a result of applying the multi-class cost-sensitive boosting method of the present disclosure to a data set comprising these features and the corresponding labels, using a decision tree algorithm as the "Weak Learning algorithm" stored in Module 2 of FIG. 1, one obtains, as the classification rule, a voting function over a number of decision trees, such as the tree shown in FIG. 5.

Experimental Evaluation

We conducted systematic experiments to compare the performance of the proposed methods with a number of existing algorithms: AdaBoost.M2 (Y. Freund and R. E. Schapire. "A decision-theoretic generalization of on-line learning and an application to boosting." Journal of Computer and System Sciences, 55(1):119-139, 1997.), AdaCost (W. Fan, S. J. Stolfo, J. Zhang, and P. K. Chan. "AdaCost; Misclassification cost-sensitive boosting." In Proceedings of the Sixteenth International Conference on Machine Learning, pages 97-105, 1999.) and CSB2 (K. M. Ting. "A comparative study of cost-sensitive boosting algorithms." In Proceedings of the Seventeenth International Conference on Machine Learning, pages 983-990, 2000.), using multi-class data sets from the UCI repository (C. L. Blake and C. J. Merz, "UCI repository of machine learning databases", Department of Information and Computer Sciences, University of California, Irvine, Calif., 1998) and on "KDD cup 99" dataset from the UCI KDD archive (The "UCI KDD Archive", Information and Computer Science, University of California, Irvine, 1999).

Comparison Methods

A representative multi-class boosting method is the AdaBoost.M2 algorithm (Y. Freund and R. E. Schapire. "A decision-theoretic generalization of on-line learning and an application to boosting." Journal of Computer and System Sciences, 55(1):119-139, 1997.). Here, we consider for comparison a version of this algorithm with the boosting weights initialized according to the misclassification costs. In obtaining a weak hypothesis with approximately minimum pseudo-loss, we use weighted sampling with the weighting scheme described by Equation 6 in the above.

One simple way to make AdaBoost.M2 cost-sensitive is to initialize the boosting weights proportionally to the misclassification costs. That this leads to a method with a theoretical guarantee on the minimization of misclassification cost can be seen relatively easily from a theorem on the boosting property of a generalization of AdaBoost.M2 for multi-label classification called AdaBoost.MR (R. E. Schapire and Y. Singer. "Improved boosting using confidence-rated predictions." Machine Learning, 37(3):297-336, 1999.). Theorem 6 (R. E. Schapire and Y. Singer. "Improved boosting using confidence-rated predictions." Machine Learning, 37(3):297-336, 1999.) essentially gives an upper bound on the so-called "ranking loss" with respect to the initial distribution $w_1$, defined effectively over the expanded data set. Noting that the ranking loss provides an upper bound on the empirical weighted misclassification error, we see that initializing $w_1$ proportionally to the misclassification costs will yield an upper bound on the empirical misclassification cost.

Various authors have noted, however, that AdaBoost tends to "forget" the cost information embedded in the initial weights, as the boosting procedure progresses, and this has motivated them to propose more involved modifications to AdaBoost for cost-sensitive learning. Here we briefly review a couple of representative methods in this family (cost-sensitive modifications of AdaBoost), namely AdaCost (W. Fan, S. J. Stolfo, J. Zhang, and P. K. Chan. "AdaCost: Misclassification cost-sensitive boosting." In Proceedings of the Sixteenth International Conference on Machine Learning, pages 97-105, 1999.) and CSB2 (K. M. Ting. "A comparative study of cost-sensitive boosting algorithms." In Proceedings of the Seventeenth International Conference on Machine Learning, pages 983-990, 2000.).

Both of these modifications are based on the generalized version of AdaBoost for confidence-rated boosting, (R. E.

Schapire and Y. Singer. "Improved boosting using confidence-rated predictions." Machine Learning, 37(3):297-336, 1999.). In particular for multi-class learning, they can be obtained as modifications of AdaBoost.MR, the multi-class, multi-label version of AdaBoost. The weight update rule of AdaBoost.MR can be stated as follows, $$w_{t+1}(i, l_0, l_1) = \frac{w_{t+1}(i, l_0, l_1)\exp\left(\frac{1}{2}\alpha_t(h_t(x_i, l_0) - h_t(x_i, l_1))\right)}{Z_t}$$

where $h_t(x_i,l)$ is a possibly real-valued (confidence rated) prediction made by the t-th weak hypothesis on the instance $x_i$ and a label l, and $\alpha_t$ is a real-valued parameter. This weight is to be defined for each correct label $l_1$ and wrong label $l_0$.

AdaCost modifies the above update rule by introducing a cost-adjustment function $\beta$, as follows.

$$w_{t+1}(i, l_0, l_1) = \frac{w_{t+1}(i, l_0, l_1)\exp(-\frac{1}{2}\alpha_t\beta(\text{sign}(\delta_{t,i}, C(l_1, l_0)\delta_{t,i}))}{Z_t}.$$

Here we let $\delta_{t,i}$ denote $h_t(x_i,l_1)-h_t(x_i,l_0)$ and $\beta$ is defined as $$\beta(\sigma, C) = \frac{1}{2}(1 - \sigma C),$$

where $\sigma \in \{-1,0,1\}$ and the cost C is assumed to be in the range [0,1]. The resulting method generalizes the original AdaCost to multi-class problems, with the choice of cost-adjustment function made by Fan et al. and used in their experiments (W. Fan, S. J. Stolfo, J. Zhang, and P. K. Chan. "AdaCost: Misclassification cost-sensitive boosting." In Proceedings of the Sixteenth International Conference on Machine Learning, pages 97-105, 1999.)

$$\left(\text{i.e } \beta_+ = \beta(+1, C) = \frac{1}{2}(1 - C) \text{ and } \beta_- = \beta(-1, C) = \frac{1}{2}(1 + C).\right)$$

The CSB family of cost-sensitive boosting methods (K. M. Ting. "A comparative study of cost-sensitive boosting algorithms." In Proceedings of the Seventeenth International Conference on Machine Learning, pages 983-990, 2000.) are also obtained by modifying the update rule of AdaBoost, but they differ from the AdaCost rule in that the cost adjustment is done multiplicatively, rather than on the exponent. Although CSB's are not defined for relational hypotheses, which allow possible ties between competing labels, a reasonable generalization for the CSB2 rule is stated below.

$$w_{t+1}(i, l_0, l_1) = \frac{w_{t+1}(i, l_0, l_1)C(l_1, l_0)^{\frac{1-\text{sign}(\delta_{t,i})}{2}}\exp\left(-\frac{1}{2}\alpha_t\delta_{t,i}\right)}{Z_t}.\backslash$$

We use this generalized version of CSB2 in our experiments.
Experimental Procedure We conducted all of our experiments using randomly generated cost matrices, except on the "KDD cup 99" data set, for which we used the cost matrix provided as part of the problem description. The experiments with synthetic cost matrices are further divided into two types, depending on how the cost matrices are generated. We generally follow the cost matrix generation procedure from (P. Domingos. "MetaCost: A general method for making classifiers cost sensitive." In Proceedings of the Fifth International Conference on Knowledge Discovery and Data Mining, pages 155-164. ACM Press, 1999.), with modifications employed by Abe et al. (N. Abe, B. Zadrozny, and J. Langford. An iterative method for multi-class cost-sensitive learning. In KDD'04: Proceedings of the tenth ACM SIGKDD international conference on Knowledge discovery and data mining, pages 3-11, New York, N.Y., USA, 2004. ACM). In the first type of cost model, which we call the "class frequency cost model", the rare classes tend to be assigned proportionally higher costs than the frequent classes. More precisely, $C(y_1,y_2)$ is assigned according to the uniform distribution from the range $[0,2000\hat{P}(y_2)/\hat{P}(y_1)]$, where $\hat{P}(y_1)$ and $\hat{P}(y_2)$ are the empirical frequencies (probabilities) of classes $y_1$ and $y_2$ in the data. The diagonal entries of the cost matrix, $C(y,y)$ are assigned identically zero (see C. Elkan, "Magical thinking in data mining: Lessons from coil challenge 2000", Proceedings of the Seventh International Conference on Knowledge Discovery and Data Mining, pp. 426-431, ACM Press, 1999), for the rationale.) This model reflects the situations often faced in real world applications, in which rare classes are more important to classify correctly (e.g., frauds in fraud detection). In the second type of cost model, or the "uniform cost model", the cost-matrices are generated by a procedure that assigns a random cost to any misclassification with a uniform distribution from the range [0, 1000].

As data sets, we elected to use those data sets from UCI ML data repository that (i) are multi-class data sets; and (ii) have a large enough data size (exceeding approximately 1,000). The second condition was placed in an attempt to make our experiments realistic, from the viewpoint of typical industrial or business applications of cost-sensitive learning.

As the "weak" learner, we use the weka j48 implementation (see I. H. Witten and E. Frank. "Data Mining: Practical machine learning tools with Java Implementations." Morgan Kaufmann, 2000) of C4.5 (Quinlan in C4.5: Programs for Machine Learning, Morgan Kaufmann (1993)), in all of our experiments. To implement the importance weighted classification required of the weak learner, we weighted rejection sampling (as described in the bottom part of FIG. 2A), rather than feeding the weights as input to the weak learner (as described in the upper part of FIG. 2A).

The number of boosting iterations in each method was set at 100, except for the largest "letter" data set, for which we performed 30 iterations for all methods. For each experiment, 10 runs are run, each of which uses a randomly generated cost matrix according to a cost model, and the average test set cost and standard error are reported. The same 10 cost matrices are used for all the comparison methods, to facilitate a fair comparison. Whenever available, we used the training and test data splits as originally provided in UCI and used it for all methods and cost matrices, and for other datasets, we performed a random split and used the same split for all experiments.

We note that in all of our boosting methods, we elected not to optimize the mixture weights $\alpha$, that is we always set $\alpha=1/t$ where t is the iteration number. We chose not to do so, in part because optimizing $\alpha$ has limited impact on the performance, but also because it may introduce additional noise in performance, which may be undesirable for our goal of comparing competing methods.

Experimental Results

The results of these experiments are shown in Table 1, Table 2, Table 3, Table 4 and Table 5. The first two tables summarize the results for the class frequency cost model, giving the average test set cost and standard error for each of the 8 data sets, and for each of four methods considered. In these and subsequent tables, the figures that correspond to best performance are shown in bold font.

Table 1 compares the average costs of all comparison methods, including a generalization of the costing algorithm ($L_-$-CSB with p=1), with $L_-$-CSB with squared loss as the representative of the proposed family of methods. From these results, it appears convincing that the $L_-$-CSB family of boosting methods out-perform all of the comparison methods we consider. It is interesting to note that the linear case (generalization of costing) does not consistently outperform AdaBoost. We need the squared loss or higher p-norm, which both correspond to boosting weights that vary over iterations, to do so.

Table 2 compares the performance of the L_P-CSB family for different values of p. It is seen that for many datasets, the performance continues to improve for higher values of p, which is what would be expected by our motivation to approximate the objective cost function by a convex p-norm functional.

Table 3 and Table 4 give the analogous results for the "uniform" cost model, which are also plotted in FIG. 6. Note here that for datasets, Pendigits and Segmentation, the two cost models are equivalent, as these are perfectly balanced datasets. Interestingly, while the cost matrices are much less dramatic than in the first case, the general trend in the experimental results remain largely unchanged. It appears from these results that the performance of the proposed family of methods is robust, in the sense that it works well for highly skewed cost matrices as well as relatively moderate ones.

Table 5 exhibits the results of our experiments on the KDD cup 99 data—the test cost (×1000), after 10 boosting iterations, averaged over 5 runs. They suggest that the relative advantage of the proposed methods over the comparison methods should persist with realistic cost matrices with mild cost values.

TABLE 1

Results for comparison methods and the proposed method (with Squared Loss) on the multi-class datasets with the class frequency cost model: the average cost and standard error.

| Data Set | AdaBoost | AdaCost | CSB2 | Linear Loss | Sq Loss |
|---|---|---|---|---|---|
| Splice | 34.62 ± 5.0 | 36.03 ± 3.4 | 527.62 ± 3.1 | 34.85 ± 2.1 | 31.31 ± 1.9 |
| Anneal | 3086.18 ± 201.4 | 1964.48 ± 152.9 | 2231.52 ± 473.6 | 26.57 ± 2.8 | 24.62 ± 3.2 |
| Sat | 124.44 ± 7.1 | 94.32 ± 8.8 | 366.26 ± 16.9 | 84.22 ± 6.3 | 77.32 ± 5.5 |
| Flare | 6030.33 ± 360.0 | 6030.33 ± 360.0 | 3710.4 ± 943.6 | 26.71 ± 8.5 | 15.99 ± 1.2 |
| Letter | 619.07 ± 28.5 | 613.89 ± 27.56 | 614.45 ± 25.11 | 621.35 ± 27.07 | 549.85 ± 64.38 |
| Pendigits | 41.9 ± 2.4 | 72.04 ± 6.2 | 68.44 ± 8.8 | 47.74 ± 2.3 | 35.27 ± 1.7 |
| Segment | 26.88 ± 2.0 | 48.94 ± 5.9 | 109.55 ± 5.2 | 30.58 ± 1.9 | 16.05 ± 1.6 |
| Thyroid | 310K ± 36K | 311K ± 37K | 5778 ± 2395 | 139.75 ± 36.6 | 99.48 ± 18.2 |

TABLE 2

Results for the proposed methods with various p-norm losses on the multi-class datasets with the class frequency cost model: the average cost and standard error.

| Data Set | Linear Loss | Sq Loss | Cub Loss | Quad Loss | 5th Loss |
|---|---|---|---|---|---|
| Splice | 34.85 ± 2.1 | 31.31 ± 1.9 | 30.11 ± 1.8 | 30.40 ± 2.0 | 31.04 ± 1.6 |
| Anneal | 26.57 ± 2.8 | 24.62 ± 3.2 | 23.94 ± 3.2 | 29.12 ± 4.1 | 26.83 ± 3.1 |
| Sat | 84.22 ± 6.3 | 77.32 ± 5.5 | 72.68 ± 6.1 | 73.25 ± 6.0 | 73.31 ± 5.7 |
| Flare | 26.71 ± 8.5 | 15.99 ± 1.2 | 15.99 ± 1.2 | 15.11 ± 1.1 | 15.09 ± 1.1 |
| Letter | 621.35 ± 27.07 | 549.85 ± 64.38 | 609.47 ± 28.07 | 610.99 ± 29.15 | 612.57 ± 28.29 |
| Pendigits | 47.74 ± 2.3 | 35.27 ± 1.7 | 32.76 ± 1.7 | 30.85 ± 1.7 | 30.66 ± 1.7 |
| Segment | 30.58 ± 1.9 | 16.05 ± 1.6 | 16.06 ± 2.9 | 19.05 ± 2.4 | 14.95 ± 2.3 |
| Thyroid | 139.75 ± 36.6 | 99.48 ± 18.2 | 109.54 ± 9.3 | 139.61 ± 36.6 | 125.99 ± 24.7 |

TABLE 3

Results for the multi-class datasets with the uniformly random cost model: the average cost and standard error.

| Data Set | AdaBoost | AdaCost | CSB2 | Linear Loss | Sq Loss |
|---|---|---|---|---|---|
| Splice | 23.72 ± 2.6 | 22.61 ± 2.9 | 22.65 ± 3.0 | 22.01 ± 2.7 | 18.98 ± 2.4 |
| Anneal | 22.24 ± 2.4 | 25.60 ± 1.6 | 26.80 ± 2.3 | 25.07 ± 2.8 | 20.27 ± 1.6 |
| Sat | 17.5 ± 0.5 | 17.7 ± 0.6 | 18.8 ± 0.8 | 16.8 ± 0.5 | 15.4 ± 0.6 |
| Flare | 23.36 ± 3.7 | 23.55 ± 3.7 | 23.63 ± 3.7 | 23.48 ± 0.4 | 22.66 ± 4.0 |
| Letter | 25.33 ± 0.89 | 25.37 ± 0.85 | 25.53 ± 0.82 | 25.32 ± 0.95 | 25.25 ± 0.88 |
| Pendigits | 5.0 ± 0.3 | 5.6 ± 0.4 | 6.3 ± 0.4 | 5.1 ± 0.3 | 3.6 ± 0.1 |
| Segment | 4.1 ± 0.5 | 4.5 ± 0.6 | 6.3 ± 0.9 | 4.2 ± 0.5 | 2.8 ± 0.3 |
| Thyroid | 51.5 ± 6.3 | 51.4 ± 6.3 | 51.6 ± 6.2 | 51.7 ± 6.3 | 47.2 ± 6.5 |

TABLE 4

Results for the proposed methods with various p-norm losses for the multi-class datasets with the uniformly random cost model: the average cost and standard error.

| Data Set | Linear Loss | Sq Loss | Cub Loss | Quad Loss | 5th Loss |
|---|---|---|---|---|---|
| Splice | 22.01 ± 2.7 | 18.98 ± 2.4 | 17.48 ± 2.1 | 17.17 ± 2.4 | 15.99 ± 2.1 |
| Anneal | 25.07 ± 2.8 | 20.27 ± 1.6 | 18.83 ± 1.7 | 16.65 ± 1.7 | 14.95 ± 2.3 |
| Sat | 16.8 ± 0.5 | 15.4 ± 0.6 | 14.77 ± 0.6 | 14.75 ± 0.7 | 14.60 ± 5.8 |
| Flare | 23.48 ± 3.7 | 22.66 ± 4.0 | 23.96 ± 3.7 | 24.51 ± 3.4 | 24.52 ± 3.9 |
| Letter | 25.32 ± 0.95 | 25.25 ± 0.88 | 24.97 ± 0.95 | 25.08 ± 0.92 | 25.05 ± 0.92 |
| Pendigits | 5.1 ± 0.3 | 3.6 ± 0.1 | 3.4 ± 0.2 | 2.4 ± 0.4 | 2.5 ± 0.3 |
| Segment | 4.2 ± 0.5 | 2.8 ± 0.3 | 2.47 ± 0.2 | 2.7 ± 0.4 | 2.51 ± 0.4 |
| Thyroid | 51.7 ± 6.3 | 47.2 ± 6.5 | 51.6 ± 6.2 | 51.6 ± 6.2 | 51.6 ± 6.2 |

TABLE 5

Results for the KDD cup 99 data: the average cost (£1000) and standard error

| Data Set | AdaBoost | AdaCost | CSB2 | Linear Loss | Sq Loss | Cub Loss | Quad Loss | 5th Loss |
|---|---|---|---|---|---|---|---|---|
| KDD99 | 1.96 ± 0.1 | 2.05 ± 0.16 | 2.02 ± 0.18 | 1.94 ± 0.09 | 1.49 ± 0.04 | 1.38 ± 0.05 | 1.59 ± 0.10 | 1.67 ± 0.07 |

A summary of the datasets is given in Table 6.

TABLE 6

Data set characteristics: size, number of classes, and ratio between the frequencies of the least and most common classes.

| Dataset | # of examples | # of classes | Class ratio |
|---|---|---|---|
| Annealing | 898 | 5 | 0.01316 |
| Solar flare | 1389 | 7 | 0.002562 |
| Letter | 20000 | 26 | 0.9028 |
| Pendigits | 10992 | 10 | 0.9222028 |
| Satellite | 6435 | 6 | 0.4083 |
| Segmentation | 2310 | 7 | 1 |
| Splice | 3190 | 3 | 0.4634 |
| Thyroid | 9172 | 20 | 0.0001476887 |
| KDD-99 | 197710 | 5 | 0.0001278 |

We have proposed a novel family of cost-sensitive boosting methods based on p-norm cost functionals and the gradient boosting framework. We provided theoretical guarantees for the proposed methods. In addition, we have provided empirical evidence that our approach can lead to excellent performance in practice, as the proposed family of methods outperforms representative algorithms on benchmark data sets.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for multi-class, cost-sensitive learning based on iterative example weighting schemes applied to a chosen data set, comprising:
   a) obtaining an expanded data set, which is defined by enhancing each example in an original data set with as many data points as there are possible labels for any single instance;
   b) repeatedly selecting one or more sub-samples from the expanded data set to construct an objective to be minimized using weighted sampling according to a predetermined example weighting scheme, wherein each non-optimally labeled example is given a weight which equals a half times an original misclassification cost for said labeled example times p−1 norm of average prediction of current hypotheses, and each optimally labeled example is given a weight which equals sum of weights for all the non-optimally labeled examples for the same instance;
   c) executing a component classification learning algorithm on the sub-sample obtained in step b) and obtaining a hypothesis representing a classifier; and
   d) outputting all classifier representations obtained in iterations of steps b) and c), each of said classifier representations being a representation of classifier.

2. The method of claim 1,
wherein the step of executing includes executing a component binary classification learning algorithm on the sub-sample and obtaining a hypothesis representing a classifier.

3. The method of claim 1, wherein each non-optimally labeled example is given a weight which equals a half times an original misclassification cost for said labeled example times p−1 norm of average prediction of current hypotheses minus per label average of the original misclassification cost times the p−1 norm of the average prediction of the current hypotheses for examples of same instance as the said labeled example, and each optimally labeled example is given a weight which equals sum of weights for all the non-optimally labeled examples for same instance, and wherein the step of executing includes executing a component binary classification learning algorithm on the sub-samples and obtaining a hypothesis representing a classifier.

4. The method of claim 1, wherein the predetermined example weighting scheme is with respect to the p-norm cost functionals.

5. The method of claim 1, wherein the predetermined example weighting scheme weighted according to gradient of cost functional evaluated at an example.

6. A method for multi-class, cost-sensitive learning based on iterative example weighting schemes applied to a chosen data set, comprising:
a) obtaining an expanded data set, which is defined by enhancing each example in an original data set with as many data points as there are possible labels for any single instance;
b) repeatedly calling a component importance-weighted classification learning algorithm with the expanded data set, with example weights, wherein each non-optimally labeled example is given a weight which equals a half times an original misclassification cost for said labeled example times p−1 norm of average prediction of current hypotheses, and each optimally labeled example is given a weight which equals sum of weights for all the non-optimally labeled examples for the same instance; and
c) outputting all classifier representations obtained through iterations of step b), each of said classifier representations being a representation of classifier and together representing an average classifier.

7. The method of claim 6, wherein each non-optimally labeled example is given a weight which equals a half times an original misclassification cost for said labeled example times p−1 norm of average prediction of current hypotheses minus per label average of the original misclassification cost times the p−1 norm of the average prediction of the current hypotheses for examples of same instance as said labeled example, and each optimally labeled example is given a weight which equals sum of weights for all non-optimally labeled examples for same instance.

8. A program storage memory device readable by a machine, tangibly embodying a program of instructions executable by the machine to perform a method for multi-class, cost-sensitive learning based on iterative example weighting schemes applied to a chosen data set, comprising:
a) obtaining an expanded data set, which is defined by enhancing each example in an original data set with as many data points as there are possible labels for any single instance;
b) repeatedly selecting one or more sub-samples from the expanded data set using weighted sampling according to a predetermined example weighting scheme, wherein each non-optimally labeled example is given a weight which equals a half times an original misclassification cost for said labeled example times p−1 norm of average prediction of current hypotheses, and each optimally labeled example is given a weight which equals sum of weights for all the non-optimally labeled examples for the same instance;
c) executing a component classification learning algorithm on the sub-sample obtained in step b) and obtaining a hypothesis representing a classifier; and
d) outputting all classifier representations obtained in iterations of steps b) and c), each of said classifier representations being a representation of classifier.

9. The program storage device of claim 8,
wherein the step of executing includes executing a component binary classification learning algorithm on the sub-sample and obtaining a hypothesis representing a classifier.

10. The program storage device of claim 8, wherein each non-optimally labeled example is given a weight which equals a half times an original misclassification cost for said labeled example times p−1 norm of average prediction of current hypotheses minus per label average of the original misclassification cost times the p−1 norm of the average prediction of the current hypotheses for examples of same instance as the said labeled example, and each optimally labeled example is given a weight which equals sum of weights for all the non-optimally labeled examples for same instance, and wherein the step of executing includes executing a component binary classification learning algorithm on the sub-samples and obtaining a hypothesis representing a classifier.

11. The program storage device of claim 8, wherein the predetermined example weighting scheme is with respect to the p−norm cost functionals.

12. The program storage device of claim 8, wherein the predetermined example weighting scheme weighted according to gradient of cost functional evaluated at an example.

13. The program storage device of claim 8, wherein said steps of b) and c) include:
b) repeatedly calling a component importance-weighted classification learning algorithm with the expanded data set, with example weights, in which each labeled example is given a weight which equals an original misclassification cost for said labeled example times p−1 norm of average prediction of current hypotheses on said labeled example.

14. The program storage device of claim 11, wherein each non-optimally labeled example is given a weight which equals a half times an original misclassification cost for said labeled example times p−1 norm of average prediction of current hypotheses, and each optimally labeled example is given a weight which equals sum of weights for all non-optimally labeled examples for same instance.

15. The program storage device of claim 11, wherein each non-optimally labeled example is given a weight which equals a half times an original misclassification cost for said labeled example times p−1 norm of average prediction of current hypotheses minus per label average of the original misclassification cost times the p−1 norm of the average prediction of the current hypotheses for examples of same instance as said labeled example, and each optimally labeled example is given a weight which equals sum of weights for all non-optimally labeled examples for same instance.

* * * * *